United States Patent [19]

Shibahata

[11] Patent Number: 5,141,072
[45] Date of Patent: Aug. 25, 1992

[54] APPARATUS FOR CONTROLLING THE DISTRIBUTION OF DRIVE POWER FOR FOUR-WHEEL-DRIVE MOTOR VEHICLES

[75] Inventor: Yasuji Shibahata, Tochigi, Japan

[73] Assignee: Honda Giken Kogyo Kabushiki Kaisha, Tokyo, Japan

[21] Appl. No.: 529,284

[22] Filed: May 29, 1990

[30] Foreign Application Priority Data

May 30, 1989 [JP] Japan ................... 1-136499

[51] Int. Cl.⁵ ........................................ B60K 17/354
[52] U.S. Cl. ........................... 180/245; 180/248; 180/249; 364/426.03; 475/84
[58] Field of Search ............... 180/248, 233, 244, 245, 180/246, 249, 197, 247; 364/426.02, 426.03, 426.01; 74/866; 475/84, 149

[56] References Cited

U.S. PATENT DOCUMENTS

| | | | |
|---|---|---|---|
| 4,681,180 | 7/1987 | Oyama | 180/248 |
| 4,702,341 | 10/1987 | Taga et al. | 180/249 |
| 4,754,835 | 7/1988 | Stelter et al. | 180/248 |
| 4,874,059 | 10/1989 | Kasegawa | 180/197 |
| 4,875,698 | 10/1989 | Uchiyama | 180/249 |
| 4,895,217 | 1/1990 | Hueckler et al. | 180/233 |
| 4,921,065 | 5/1990 | Hamada | 180/245 |
| 4,973,294 | 11/1990 | Kobari et al. | 475/84 |

FOREIGN PATENT DOCUMENTS

| | | | |
|---|---|---|---|
| 0094421 | 4/1987 | Japan | 180/233 |
| 62-203826 | 9/1987 | Japan | |
| 0101237 | 4/1989 | Japan | 180/245 |
| 2213443A | 8/1989 | United Kingdom | |
| 2216473A | 10/1989 | United Kingdom | |

Primary Examiner—Charles A. Marmor
Assistant Examiner—A. M. Boehler
Attorney, Agent, or Firm—Armstrong, Nikaido, Marmelstein, Kubovcik & Murray

[57] ABSTRACT

The distribution of drive power produced by a drive power source is controlled in a four-wheel-drive motor vehicle having main drive wheels and auxiliary drive wheels. Drive powers produced by the drive power source are independently regulated and transmitted to the left and right auxiliary drive wheels. While the drive power distribution ratio between the main and auxiliary drive wheels is maintained at a suitable value, the drive powers are variable distributed between the left and right auxiliary drive wheels by a drive power distribution control system. The drive power distribution control system determines the drive power distribution ratio between the left and right auxiliary drive wheels depending on a detected lateral acceleration exerted to the motor vehicle, and transmits the drive powers to the left and right auxiliary drive wheels according to the determined drive power distribution ratio.

3 Claims, 4 Drawing Sheets

APPARATUS FOR CONTROLLING THE DISTRIBUTION OF DRIVE POWER FOR FOUR-WHEEL-DRIVE MOTOR VEHICLES

BACKGROUND OF THE INVENTION

1. Field of the Invention

The present invention relates to an apparatus for controlling the distribution of drive power between left and right wheels of one of front and rear wheels pairs of a four-wheel-drive motor vehicle through independent adjustment of such drive power, and also the distribution of drive power between the front and rear wheels, and more particularly to an apparatus for controlling the distribution of drive power between such left and right wheels while the ratio of drive power distributed between the front and rear wheels is being maintained at a proper level when the motor vehicle is making a turn.

2. Description of the Relevant Art

Motor vehicles such as four-wheel-drive motor vehicles have both front and rear wheels driven by the engines mounted thereon. In some recent motor vehicles with front and rear drive wheels, the ratio of drive power distributed between the front and rear wheels is controlled depending on the running conditions of the motor vehicles for better running performance. It is also desirable in such motor vehicles to further control the ratio of drive power distributed between the left and right wheels for improving the turning performance when the motor vehicle makes a turn. However, difficulty has heretofore been experienced in simultaneously controlling the ratio of drive power distributed between the front and rear wheels and the ratio of drive power distributed between the left and right wheels so that these drive power distribution ratios will be of optimum values.

SUMMARY OF THE INVENTION

In view of the aforesaid difficulty of the conventional apparatus for controlling the drive power distribution, it is an object of the present invention to provide an apparatus for controlling the ratio of drive power distributed between left and right wheels of one of front and rear wheel pairs of a four-wheel-drive motor vehicle while keeping unchanged the ratio of drive power distributed between the front and rear wheels.

According to the present invention, there is provided an apparatus for controlling the distribution of drive power in a four-wheel-drive motor vehicle which has main drive wheels, auxiliary drive wheels, and a drive power source for transmitting the drive power to the main and auxiliary drive wheels, the apparatus comprising drive power distribution control means for independently regulating and transmitting drive powers from the drive power source to left and right auxiliary drive wheels and for variably distributing the drive power between the left and right auxiliary drive wheels while maintaining the ratio of drive powers distributed between the main and auxiliary drive wheels at an appropriate value.

The apparatus further comprises lateral acceleration detecting means for detecting a lateral acceleration exerted to the motor vehicle, the drive power distribution control means comprising means for determining the ratio of drive powers between the left and right auxiliary drive wheels depending on the lateral acceleration detected by the lateral acceleration detecting means, and for transmitting the drive powers to the left and right auxiliary drive wheels according to the determined ratio.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
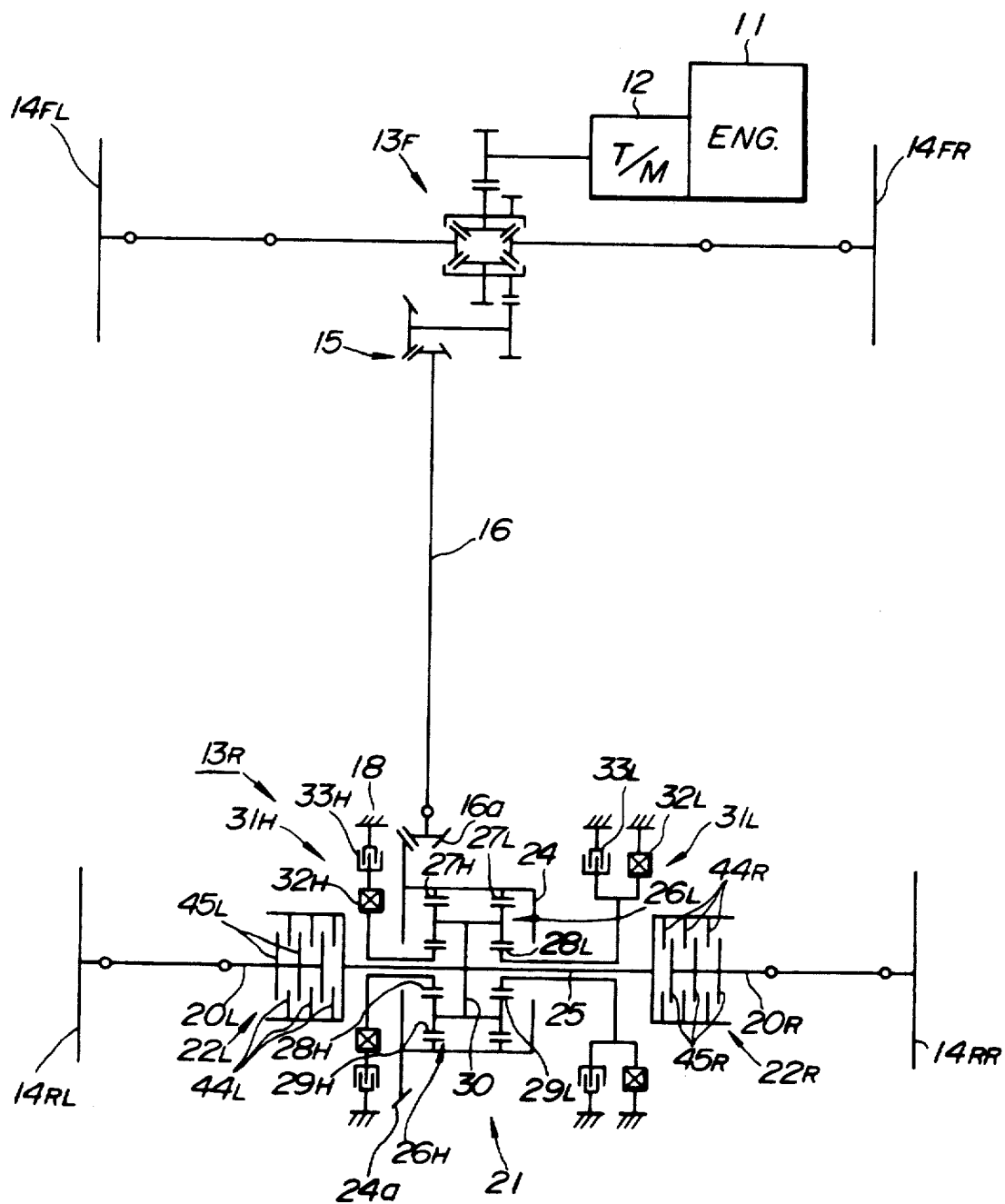
FIG. 1 is a schematic skeleton diagram of a drive power transmitting system in a motor vehicle with front and rear drive wheels, the motor vehicle incorporating an apparatus for controlling the distribution of drive power according a preferred embodiment of the present invention.

FIG. 1 schematically shows a drive power transmitting system in a four-wheel-drive motor vehicle which incorporates an apparatus for controlling the distribution of drive power according a preferred embodiment of the present invention. The four-wheel-drive motor vehicle is constructed on the basis of a front-engine front-drive motor vehicle with an additional rear-drive mechanism. The motor vehicle has an engine 11, a transmission 12 integrally coupled to the engine 11, a front differential 13F to which the output shaft of the transmission 12 is coupled, and a rear differential 13R operatively coupled to the front differential 13F through a gear mechanism 15 and a propeller shaft 16.

Left and right front wheels, serving as main drive wheels, 14FL, 14FR are coupled to laterally opposite output shafts, respectively, of the front differential 13F through respective axles. Similarly, left and right rear wheels, serving as auxiliary drive wheels, 14RL, 14RR are coupled to laterally opposite output shafts, respectively, of the rear differential 13R through respective axles.

The rear differential 13R has a case 24 accommodating therein a transmission mechanism 21 which comprises two planetary gear assemblies 26H, 26L. The rear differential 13R also has two hydraulic multiple-disc clutches 22L, 22R of the variable transmission capability type which are disposed on the lefthand and righthand sides, respectively, of the transmission mechanism 21. The case 24, the transmission mechanism 21, and the hydraulic multiple-disc clutches 22L, 22R are housed in a housing 18 (shown hatched in FIG. 1) supported on the vehicle body.

A bevel gear 16a which is fixed to the rear end of the propeller shaft 16 is held in mesh with a bevel gear 24a fixed to an outer peripheral wall of the case 24. A main shaft 25 which extends transversely with respect to the motor vehicle is rotatably supported in the case 24. The planetary gear assemblies 26H, 26L are disposed around the main shaft 25 in the case 24.

The planetary gear assemblies 26H, 26L comprise respective ring gears 27H, 27L fixed to an inner wall surface of the case 24, respective sun gears 28H, 28L rotatably mounted on the main shaft 25, and two sets of planet gears 29H, 29L disposed between and held in mesh with the ring gears 27H, 27R and the sun gears 28H, 28L. The planet gears 29H, 29L are supported on a substantially tubular carrier 30. The sun gear 28H is engageable with the housing 18 through a lock clutch 31H, and the sun gear 28L is also engageable with the housing 18 through a lock clutch 31L. The carrier 30 has its inner peripheral central portion coupled by splines or the like to the main shaft 25 for rotation therewith.

When the sun gear 28H of the lefthand planetary gear assembly 26H is fixed, i.e., engages the housing 18, the ring gear 27H and the carrier 30 are coupled together at a speed reduction ratio for increasing the rotational speed of drive power which is transmitted from the ring gear 27H to the carrier 30. When the sun gear 28L of the righthand planetary gear assembly 26L is fixed, the ring gear 27L and the carrier 30 are coupled together (substantially directly coupled together) at a speed reduction ratio for substantially equalizing the rotational speed of the front wheels 14FL, 14FR and the rotational speed of the rear wheels 14RL, 14RR.

The lefthand lock clutch 31H comprises a one-way clutch 32H and a hydraulic clutch 33H interposed in series between the sun gear 28H and the housing 18. The hydraulic clutch 33H comprises a plurality of plates supported by splines or the like on the inner peripheral surface of a drum which is integral with the housing 18, and a plurality of plates supported by splines or the line on the outer peripheral surface of a sleeve which confronts the inner peripheral surface of the drum. These plates are interleaved for axial frictional engagement. The hydraulic clutch 33H also includes a piston (not shown) which is operable in response to a hydraulic pressure supplied from a hydraulic circuit (described later), for frictionally engaging these plates. The one-way clutch 32H is disposed between the sun gear 28H and the sleeve of the hydraulic clutch 33H, and allows the sun gear 28H and the sleeve to rotate relatively in only one direction. When torque is transmitted from the ring gear 27H to the carrier 30, i.e., when drive power is transmitted from the engine 11 to the rear wheels 14RL, 14RR, the one-way clutch 32H secures the sun gear 28H and the sleeve of the hydraulic clutch 33H to each other.

The righthand lock clutch 31L comprises a one-way clutch 32L and a hydraulic clutch 33L interposed parallel between the sun gear 28L and the housing 18. As with the hydraulic clutch 33H, the hydraulic clutch 33L comprises a plurality of plates supported on a drum which is integral with the housing 18, and a plurality of plates supported on a sleeve coupled to the sun gear 18, the plates being interleaved for axial frictional engagement. The hydraulic clutch 33L also includes a piston (not shown) which is operable in response to a hydraulic pressure supplied from the hydraulic circuit, for frictionally engaging these plates. The one-way clutch 32L is disposed between the housing 18 and the sun gear 28L, and allows the housing 18 and the sun gear 28H to rotate relatively in only one direction. When drive power is transmitted from the engine 11 to the rear wheels 14RL, 14RR, the one-way clutch 32L secures the sun gear 28L to the housing 18.

The lefthand hydraulic multiple-disc clutch 22L comprises a drum fixedly mounted on the lefthand end of the main shaft 25 and a sleeve fixedly mounted on an output shaft 20L which is coupled through an axle to the left rear wheel 14RL. The clutch 22L also has a plurality of plates 44L splined or otherwise fixed to the inner periphery of the drum, and a plurality of plates 45L splined or otherwise fixed to the outer periphery of the sleeve, the plates 44L, 45L being interleaved for axial frictional engagement. The plates 44L, 45L are brought into frictional engagement with each other when they are pushed together by a piston (not shown) that is actuated by a hydraulic pressure supplied from the hydraulic circuit. Therefore, the hydraulic multiple-disc clutch 22L couples the main shaft 25 and the output shaft 20L under the force depending on the hydraulic pressure supplied from the hydraulic circuit. The righthand hydraulic multiple-disc clutch 22R is of the same construction as that of the lefthand hydraulic multiple-disc clutch 22L. Those components of the clutch 22R which are identical to those of the clutch 22L are denoted by identical reference numerals with a suffix R, and are not described in detail. The hydraulic multiple-disc clutch 22R couples the main shaft 25 and the output shaft 20R under the engaging force depending on the hydraulic pressure supplied from the hydraulic circuit.

Figure 2:
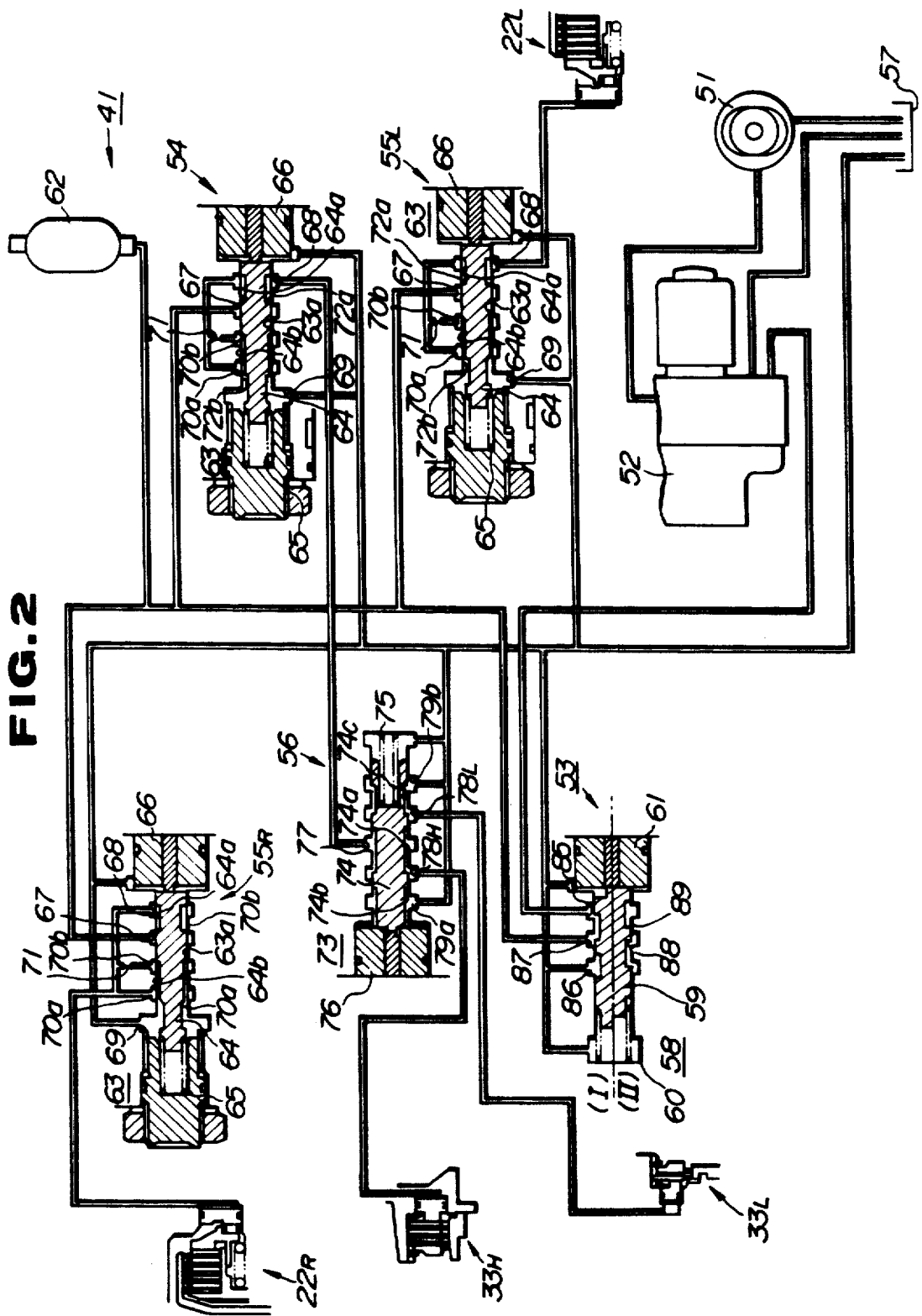
FIG. 2 is a circuit diagram of a hydraulic circuit of the apparatus for controlling the distribution of drive power shown in FIG. 1.

As shown in FIG. 2, the hydraulic circuit, which is generally designated by the reference numeral 41, has a pump 51, an unloading pressure control valve 52, a fail-safe valve 53, three pressure control valves 54, 55L, 55R, and a shift valve 56. Oil under pressure which is discharged by the pump 51 is supplied through the unloading pressure control valve 52 and the fail-safe valve 53, and regulated in pressure by the pressure control valves 55L, 55R. The regulated hydraulic pressure is led to the lefthand and righthand hydraulic multiple-disc clutches 22L, 22R. The oil from the pump 51 is also regulated in pressure by the pressure control valve 54, and the regulated hydraulic pressure is supplied alternatively to the lefthand and righthand hydraulic clutches 33H, 33L. The pump 91 comprises a known vane pump, and is driven directly by the crankshaft of the engine 11 or an electric motor for discharging oil from a reservoir tank 57 under pressure. The unloading pressure control valve 52 returns oil under pressure to the reservoir tank 57 when the discharge pressure of the pump 51 is in excess of a predetermined pressure level.

The fail-safe valve 53 comprises a spool 59 slidably disposed in a housing 58. The spool 59 is normally urged axially in one direction under the force of a return spring 60 disposed under compression between one side of the housing 58 and the end of the spool 59. A solenoid 61 electrically connected to a controller 35 (described later) is fixed to the opposite side of the housing 58. The housing 58 has an inlet port 85, a drain port 86, and an outlet port 87 which are defined therein. The inlet port 85 is connected to the unloading pressure control valve 52, the drain port 86 to the reservoir tank 57, and the outlet port 87 to the three pressure control valves 54, 55L, 55R parallel to each other.

The spool 59 has two grooves 88, 89 defined in a region corresponding to the ports 85, 86, 87. When the spool 59 is positioned in a position (I), which is shown at an upper half, the outlet port 87 communicates with the inlet port 85 through the groove 89. When the spool 59 is positioned in a position (II), which is shown at a lower half, the outlet port 87 communicates with the drain port 86 through the groove 88. When the motor vehicle runs normally, the solenoid 61 is energized to shift the spool 59 into the position (I) to supply oil under pressure to the pressure control valves 54, 55L, 55R. When the hydraulic circuit 41 fails or malfunctions or when the engine 11 stops, the solenoid 61 is de-energized to shift the spool 59 into the position (II) under the bias of the return spring 60, thereby cutting off the oil supply to the pressure control valves 54, 55L, 55R and returning the oil under pressure from these pressure control valves to the reservoir tank 57.

The pressure control valve 54 comprises a spool 64 slidably housed in a bore 63a defined in a housing 63. A return spring 65 for urging the spool 64 in one direction is disposed under compression between one side of the housing 63 and the end of the spool 64. A solenoid 66 for axially moving the spool 64 against the bias of the return spring 65 is disposed on the opposite side of the housing 63. The solenoid 66 is electrically connected to the controller 35. The housing 63 has an inlet port 67 connected to the fail-safe valve 53, an outlet port 68 connected to the shift valve 56, a drain port 69 connected to the reservoir tank 57, a first control port 70a communicating with the outlet port 68, and a second control port 70b communicating with the outlet port 68 through a restriction 71. The spool 64 has a groove 64a and a shallow spool 64b which defines a gap between the spool 64 and a peripheral wall of the bore 63a. The groove 64a provides a variable restriction 72a between the inlet port 67 and the outlet port 68, whereas the shallow groove 64b provides a variable restriction 72b between the control ports 70a, 70b and the drain port 69. When the solenoid 66 is energized, it urges the spool 64 to move axially under a force depending on the current supplied to the solenoid 66, thus varying the hydraulic resistances of the variable restrictions 72a, 72b in opposite directions to regulate the hydraulic pressure discharged from the outlet port 68.

The shift valve 56 comprises a spool 74 slidably disposed in a housing 73. A return spring 75 for urging the spool 74 in one direction is disposed under compression between one side of the housing 73 and the end of the spool 74. A solenoid 76 for axially moving the spool 74 against the bias of the return spring 75 is fixedly disposed on the opposite side of the housing 73. The solenoid 76 is electrically connected to the controller 35. The housing 73 has an inlet port 77 connected to the pressure control valve 54, an outlet port 78H connected to the lefthand hydraulic clutch 33H, an outlet port 78L connected to the righthand hydraulic clutch 33L, and two drain ports 79a, 79b connected to the reservoir tank 57. The spool 74 has grooves 74a, 74b, 74c by which the outlet ports 78H, 78L are brought into selective communication with the inlet port 77 or the drain ports 79a, 79b. When the solenoid 76 is energized by the controller, it urges the spool 74 to move axially against the bias of the return spring 75. When the solenoid 76 is de-energized (as shown), the inlet port 77 and the outlet port 78H communicate with each other and the drain port 79b and the outlet port 78L communicate with each other, introducing hydraulic pressure to the lefthand hydraulic clutch 33H. With the solenoid 76 energized, fluid communication is established between the inlet port 77 and the outlet port 78L and also between the outlet port 78H and the drain port 79a, thereby applying hydraulic pressure to the righthand hydraulic clutch 33L.

The pressure control valves 55L, 55R are of the same structure as that of the pressure control valve 54. The pressure control valve 55L has its outlet port 68 connected to the lefthand hydraulic multiple-disc clutch 22L, and regulates the hydraulic pressure supplied to the clutch 22L depending on a current which is supplied from the controller 35 to the solenoid 66. Likewise, the pressure control valve 55R has its outlet port 68 connected to the righthand hydraulic multiple-disc clutch 22R, and supplies regulated hydraulic pressure to the clutch 22R. Those parts of the pressure control valves 55L, 55R which are identical to those of the pressure control valve 54 are designated by identical reference numerals, and will not be described in detail. An accumulator 62 is connected to the hydraulic circuit 41 for storing oil under pressure in the known fashion.

Figure 3:
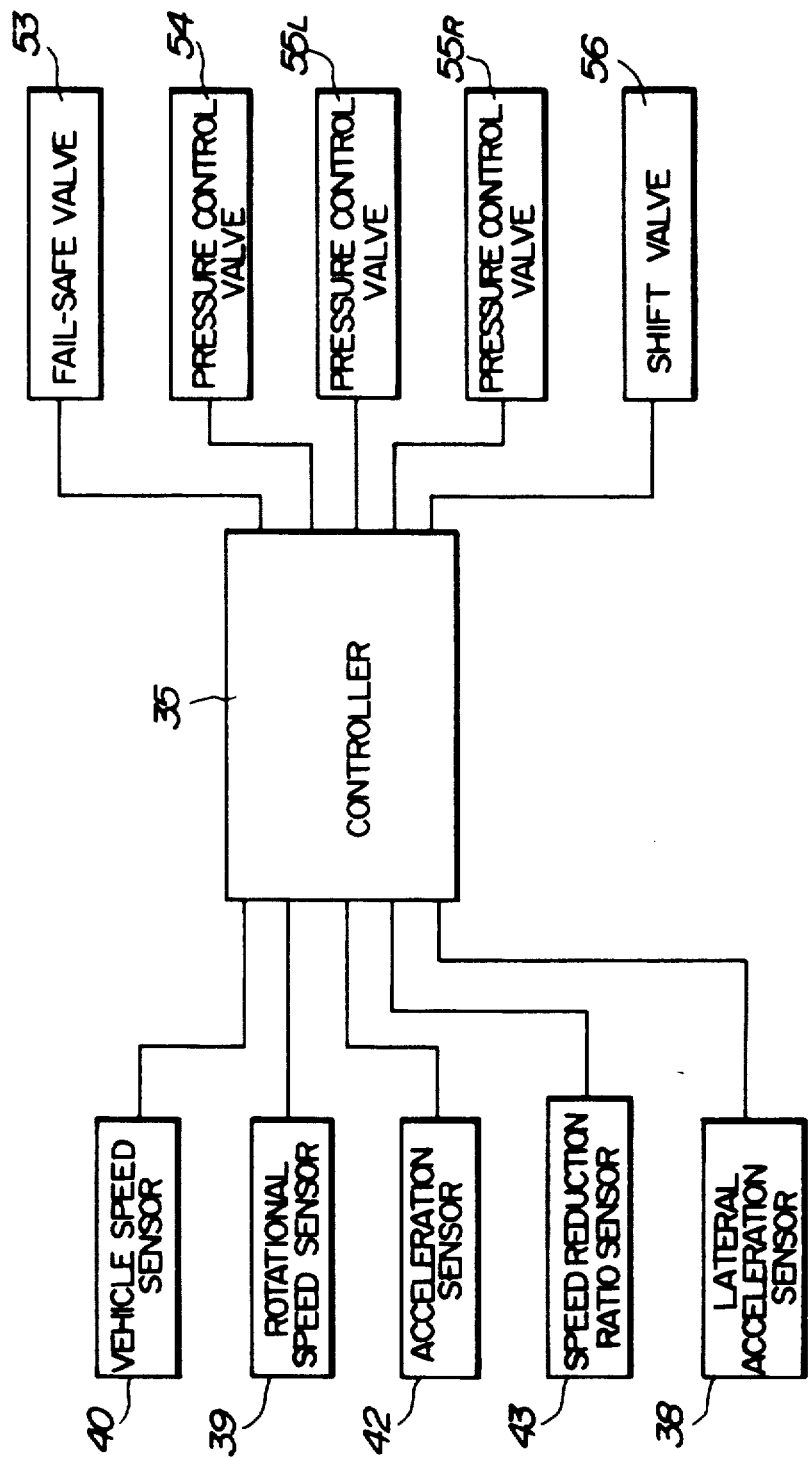
FIG. 3 is a block diagram of a control system for the drive power distribution control apparatus.

The controller 35 comprises a one-chip microcomputer or the like. As shown in FIG. 3, the controller 35 is electrically connected to the solenoid 61 of the failsafe valve 53, the solenoids 66 of the pressure control valves 54, 55L, 55R, and the solenoid 76 of the shift valve 56. To the controller 35, there are also electrically connected a vehicle speed sensor 40 for detecting the speed of the motor vehicle, a rotational speed sensor 39 for detecting the rotational speed (R.P.M.) of the engine 11, an accelerator sensor 42 for detecting the opening S of the throttle valve of the engine 11, a speed reduction ratio sensor 43 for detecting the speed reduction ratio of the transmission 12, and a lateral acceleration sensor 38 for detecting a lateral acceleration imposed on the motor vehicle. The controller 35 processes output signals from these sensors 38, 49, 40, 42, 43 according to a control program stored in a ROM or the like, and controls the fail-safe valve 53, the shift valve 56, and the pressure control valves 54, 55L, 55R.

The accelerator sensor 42 may be replaced with a sensor which detects the intake vacuum of the engine 11 or the stroke or interval by which the accelerator pedal is depressed. The lateral acceleration sensor 38 and the speed reduction sensor 43 may be of any known design.

The apparatus for controlling the distribution of drive power for the four-wheel-drive motor vehicle operates as follows:

The ratio at which the drive power from the engine 11 is distributed between the front wheels 14FL, 14FR and the rear wheels 14RL, 14RR is controlled when the engaging forces of the lefthand and righthand hydraulic multiple-disc clutches 22L, 22R are varied, and the ratio at which the drive power from the engine 11 is distributed between the left and right rear wheels 14RL, 14RR is adjusted, i.e., differential rotation between the rear wheels 14RL, 14RR is limited. The transmission mechanism 21 can vary the rotational speed of the drive power transmitted from the engine 11 to the rear wheels 14RL, 14RR.

When the lefthand hydraulic clutch 33H is engaged, and insofar as the drive power is applied to the rear wheels 14RL, 14RR, the sun gear 28H is locked by the hydraulic clutch 33H and the one-way clutch 32H, causing the planetary gear assembly 26H to couple the rear wheels 14RL, 14RR to the front wheels 14FL, 14FR at a speed reduction ratio for increasing the rotational speed of the drive power transmitted to the rear wheels 14RL, 14RR. When the righthand hydraulic clutch 33L is engaged, the sun gear 28L is locked by the hydraulic clutch 33L, causing the planetary gear assembly 26L to couple the rear wheels 14RL, 14RR directly to the front wheels 14FL, 14FR. When both the hydraulic clutches 33H, 33L are disengaged, and insofar as the drive power is applied to the rear wheels 14RL, 14Rr, the sun gear 28L is locked by the one-way clutch 32L, coupling the rear wheels 14RL, 14RR directly to the front wheels 14FL, 14FR.

Different control modes of the drive power distribution control apparatus will be described below. In each of the control modes, the drive power transmitting system shown in FIG. 1, the hydraulic circuit shown in FIG. 2, and the control system shown in FIG. 3 are employed.

A first control mode of the drive power distribution control apparatus will first be described below.

Figure 4:
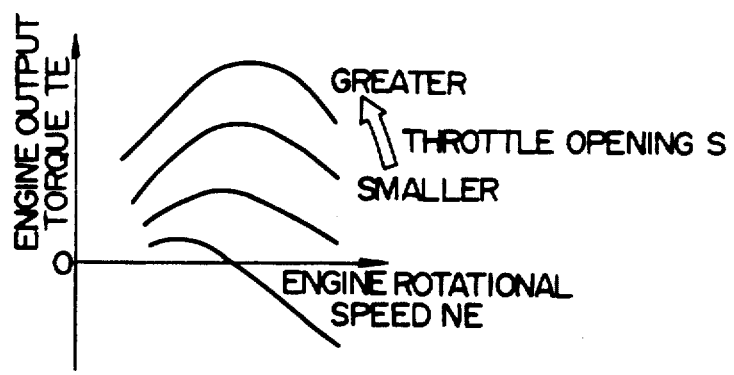
FIG. 4 is a diagram showing engine output characteristics employed in a first control mode of the drive power distribution control apparatus.

Based on the engine rotational speed NE detected by the rotational speed sensor 39 and the throttle valve opening S detected by the accelerator sensor 42, the controller 35 determines an output torque TE of the engine 11 according to the data table shown in FIG. 4. Then, the controller 35 calculates target drive powers TRL, TRR for the left and right rear wheels 14RL, 14RR according to the equations (1), (2), given below, based on the determined output torque TE, the speed reduction ratio R of the transmission 12 detected by the speed reduction ratio sensor 43, and the lateral acceleration Y detected by the lateral acceleration sensor 38.

$$TRL = TE \cdot R \cdot \eta \cdot (1 - k \cdot Y) \qquad (1)$$

$$TRR = TE \cdot R \cdot \eta \cdot (1 - k \cdot Y) \qquad (2)$$

where $\eta$ is an initial value for the drive power distribution ratio for one rear wheel, which value is determined on the basis of the specifications of the motor vehicle, and k is a coefficient for matching various values. The lateral acceleration Y is positive in the rightward direction. As is apparent from the above equations (1) and (2), in accordance with the present invention, the sum (hereinafter referred to as an "entire rear wheel drive power") TR of the drive powers TRL, TRR for the left and right rear wheels 14RL, 14RR (TR = TRL + TRR = TE × R × 2$\eta$) is maintained at a constant level, and a value corresponding to the lateral acceleration is added to or subtracted from the drive powers TRL, TRR. Then, based on the target drive powers TRL, TRR, the controller 35 supplies currents having values corresponding to the target drive powers TRL, TRR to the solenoids 66 of the pressure control valves 55L, 55R, thereby supplying hydraulic pressures depending on the target driver powers TRL, TRR to the hydraulic multiple-disc clutches 22L, 22R.

Therefore, the ratio of drive power distributed between the left and right rear wheels 14RL, 14RR is controlled depending on a turn which is being made by the motor vehicle, i.e., so as to correspond to the lateral acceleration. The sum (entire front wheel drive power) of drive powers for the left and right front wheels 14FL, 14FR is determined to be of a value [TE × R × (1 − 2$\eta$)], whereas the entire rear wheel drive power is determined to be of a value [TE × R × 2$\eta$]. Thus, the drive power distribution between the front and rear wheels remains unchanged. Since the drive power distribution between the front and rear wheels is kept at a suitable value and the drive power distribution ratio between the left and right rear wheels 14RL, 14RR is controlled depending on how the motor vehicle makes a turn, the motor vehicle is allowed to travel under good running conditions.

In the first control mode, as described above, the drive power distribution ratio between the front and rear wheels is first determined and then the entire rear wheel drive power is determined and distributed between the left and right rear wheels 14RL, 14RR depending on the lateral acceleration exerted to the motor vehicle. Therefore, the drive power distribution ratio between the left and right rear wheels 14RL, 14RR can be determined to be of a suitable value without affecting the drive power distribution ratio between the front and rear wheels. As a consequence, good running conditions are assured for the motor vehicle while it is making a turn.

A second control mode of the drive power distribution control apparatus will be described below.

Figure 5:
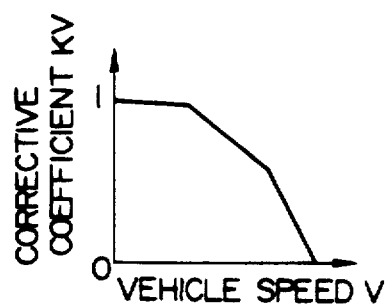
FIG. 5 is a diagram showing a data table of corrective coefficients KV versus vehicle speeds, employed in a second control mode of the drive power distribution control apparatus.

In the second control mode, a corrective coefficient KV is determined from the data table shown in FIG. 5 based on the vehicle speed which is detected by the vehicle speed sensor 40, and target drive powers TRL, TRR for the left and right rear wheels 14RL, 14RR are determined according to the following equations (3) and (4):

$$TRL = TE \times R \times \eta \times (1 + k \times KV \times Y) \qquad (3)$$

$$TRR = TE \times R \times \eta \times (1 - k \times KV \times Y) \qquad (4)$$

As shown in FIG. 5, the corrective coefficient KV is smaller than 1 in a high vehicle speed range. Therefore, any changes in the drive power distribution ratio between the left and right rear wheels 14RL, 14RR are reduced in the high vehicle speed range. Stated otherwise, as the vehicle speed goes higher, the drive power distribution ratio between the rear wheels approaches 1. Consequently, the drive power distribution ratio between the left and right rear wheels 14RL, 14RR is controlled so that it is of a value suitable for the vehicle speed V. According to the second control mode, the motor vehicle is given a better running performance, especially, a better turning performance.

A third control mode of the drive power distribution control apparatus will be described below.

Figure 6:
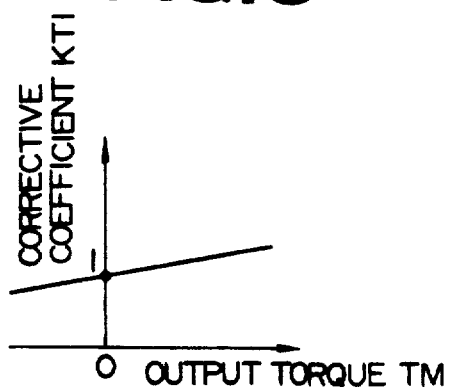
FIG. 6 is a diagram showing a data table of corrective coefficients KT versus output torques TM, employed in a third control mode of the drive power distribution control apparatus.

In the third control mode, a corrective coefficient KT is determined from the data table shown in FIG. 6 based on the output torque TM (TM = TE × R) of the transmission 12, and target drive powers TRL, TRR for the left and right rear wheels 14RL, 14RR are calculated according to the following equations (5) and (6):

$$TRL = TE \times R \times \eta \times KT \times (1 + k \times Y) \qquad (5)$$

$$TRR = TE \times R \times \eta \times KT \times (1 - k \times Y) \qquad (6)$$

Figure 7:
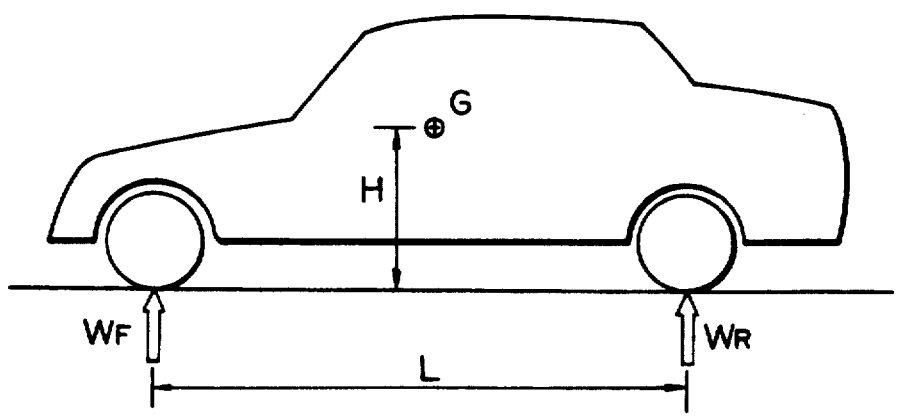
FIG. 7 is a schematic side elevational view illustrative of the manner in which loads of front and rear wheels on a road vary when an acceleration is exerted to a motor vehicle.

According to the third control mode, since the drive power distribution ratio between the front and rear wheels or the entire rear wheel drive power varies depending on the output torque TM of the transmission 12, the drive power distribution ratio between the front and rear wheels can be kept at an appropriate value even if loads on the front and rear wheels vary at the time the motor vehicle is accelerated or decelerated. More specifically, as shown in FIG. 7, if an acceleration $a$ is exerted to the motor vehicle when it is accelerated, a load WF of the front wheels on the road and a load WR of the rear wheels on the road vary depending on the output torque TM of the transmission 12 according to equations given below, and hence a suitable value for the drive power distribution ratio between the front and rear wheels also varies. In view of this, in the third control mode, the drive power distribution between the front and rear wheels is varied depending on the output torque TM of the transmission 12 so that the drive power distribution ratio between the front and rear wheels is kept at an optimum value. Therefore, the running performance of the motor vehicle, particularly the accelerating performance thereof, is increased.

$$WR = WRO + (\tfrac{1}{2}) \times (H/L) \times W \times a \quad (7)$$
$$= WRO + (\tfrac{1}{2}) \times (H/L) \times TE \times R$$

$$WF = WFO + (\tfrac{1}{2}) \times (H/L) \times W \times a \quad (8)$$
$$= WFO + (\tfrac{1}{2}) \times (H/L) \times TE \times R$$

where WF0 is a load of the front wheels on the road when the motor vehicle is at rest, WR0 is a load of the rear wheels on the road when the motor vehicle is at rest, W is the weight of the motor vehicle, L is the wheelbase of the motor vehicle, and H is the height of the center of gravity G of the motor vehicle.

The operation of the drive power distribution control apparatus according to the present invention is not limited to the first, second, and third modes as described above, but may be modified to meet various applications. For example, the second and third control modes may be combined with each other.

With the drive power distribution control apparatus according to the present invention, as described above, the drive power distributed between the left and right wheels of either of the front and rear wheel pairs can be variably regulated or varied in response to lateral acceleration or other parameters, while the drive power distribution ratio between the front and rear wheels is maintained at a suitable value. Therefore, good running performance is obtained for the motor vehicle.

Although there has been described what is at present considered to be the preferred embodiment of the present invention, it will be understood that the invention may be embodied in other specific forms without departing from the essential characteristics thereof. The present embodiment is therefore to be considered in all aspects as illustrative, and not restrictive. The scope of the invention is indicated by the appended claims rather than by the foregoing description.

I claim:

1. An apparatus for controlling the distribution of drive power in a four-wheel-drive motor vehicle which has a drive power transmitting system, a drive power source for applying the drive power to the drive power transmitting system, and main drive wheels and auxiliary drive wheels which are coupled to the drive power transmitting system, said apparatus comprising:

drive power distributing means for independently regulating drive power transmitted through the drive power transmitting system to left and right auxiliary drive wheels, and for variably distributing the drive power between said left and right auxiliary drive wheels and the drive power between said main and auxiliary drive wheels; and control means for controlling said drive power distributing means to distribute drive power between said left and right auxiliary drive wheels while maintaining the ratio of drive power between said main and auxiliary drive wheels at an appropriate value, output torque detecting means for detecting an output torque (T) from said drive power source; and lateral acceleration detecting means for detecting a lateral acceleration (Y) exerted to the motor vehicle;

said control means comprising means for calculating target drive powers (TL, TR) to be transmitted to said left and right auxiliary drive wheels based on the detected output torque and the detected lateral acceleration according to the following equations:

$$TL = T \times \eta \times (1 + k \times Y)$$

$$TR = T \times \eta \times (1 - k \times Y)$$

where $\eta$ is an initial value for the drive power distribution ratio for one of the left and right auxiliary drive wheels, the initial value being determined on the basis of the specification of the motor vehicle, and k is a conversion coefficient for matching various values, and for controlling said drive power distributing means according to the calculated target drive power.

2. An apparatus according to claim 1, further comprising vehicle speed detecting means for detecting a vehicle speed (V) of the motor vehicle, said control means comprising means for calculating target drive powers (TL, TR) to be transmitted to the left and right auxiliary drive wheels using corrective coefficient data (KV) which are smaller than 1 in at least a high vehicle speed range, according to the following equations:

$$TL = T \times \eta \times (1 + k \times KV \times Y)$$

$$TR = T \times \eta \times (1 - k \times KV \times Y)$$

and for controlling said drive power distributing means according to the calculated target drive powers.

3. An apparatus according to claim 1, wherein said control means comprises means for calculating target drive powers (TL, TR) to be transmitted to the left and right auxiliary drive wheels using corrective coefficient data (KT) which are progressively greater as said output torque increases, according to the following equations:

$$TL = T \times \eta \times KT \times (1 + k \times Y)$$

$$TR = T \times \eta \times KT \times (1 - k \times Y)$$

and for controlling said drive power distributing means according to the calculated target drive powers.

* * * * *